(12) United States Patent
Itou et al.

(10) Patent No.: US 7,339,112 B2
(45) Date of Patent: Mar. 4, 2008

(54) ELECTRIC SUPPLY DEVICE

(75) Inventors: Gaku Itou, Shizuoka (JP); Norio Watanabe, Shizuoka (JP); Naotaka Ogawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/378,260

(22) Filed: Mar. 20, 2006

(65) Prior Publication Data

US 2006/0254800 A1 Nov. 16, 2006

(30) Foreign Application Priority Data

May 16, 2005 (JP) ............... 2005-142448
Aug. 31, 2005 (JP) ............... 2005-252763

(51) Int. Cl.
*H01B 1/00* (2006.01)

(52) U.S. Cl. ................. 174/72 A; 174/68.3; 174/70 C; 174/70 R; 174/71 R

(58) Field of Classification Search ............. 174/72 A, 174/68.3, 48, 69, 99 E, 70 A, 70 C, 70 R, 174/72 R, 71 R; 361/826, 601; 439/11.34
See application file for complete search history.

(56) References Cited

U.S. PATENT DOCUMENTS 6,515,229 B2   2/2003  Aoki et al.
6,566,603 B2 *  5/2003  Doshita et al. ........... 174/72 A
6,903,274 B2 *  6/2005  Aoki et al. ............... 174/72 A
7,075,011 B1 *  7/2006  Kogure et al. ........... 174/72 A
2005/0092512 A1  5/2005  Kogure et al. ................ 174/72

FOREIGN PATENT DOCUMENTS

DE   102 50 150 A1   5/2003
JP   2002-17032     1/2002

OTHER PUBLICATIONS

Communication from German Patent Office mailed May 15, 2007 with English translation (7 pages).

* cited by examiner

*Primary Examiner*—Dhiru R. Patel
(74) *Attorney, Agent, or Firm*—Kratz, Quintos & Hanson, LLP

(57) ABSTRACT

An electric supply device includes: a protector arranged in a slide structure; and a wiring harness guided out being bent from a harness fixing part situated in the protector toward a fixed structure, wherein the harness fixing part is situated in an opening direction of the slide structure, wherein the wiring harness is arranged in a closing direction of the slide structure from the harness fixing part, so that the wiring harness is bent nearly in a loop-shape in the protector when the slide structure is closed. A projection for supporting the wiring harness is provided in the proximity of an opening of the protector, from which the wiring harness is guided out toward the fixed structure.

5 Claims, 6 Drawing Sheets

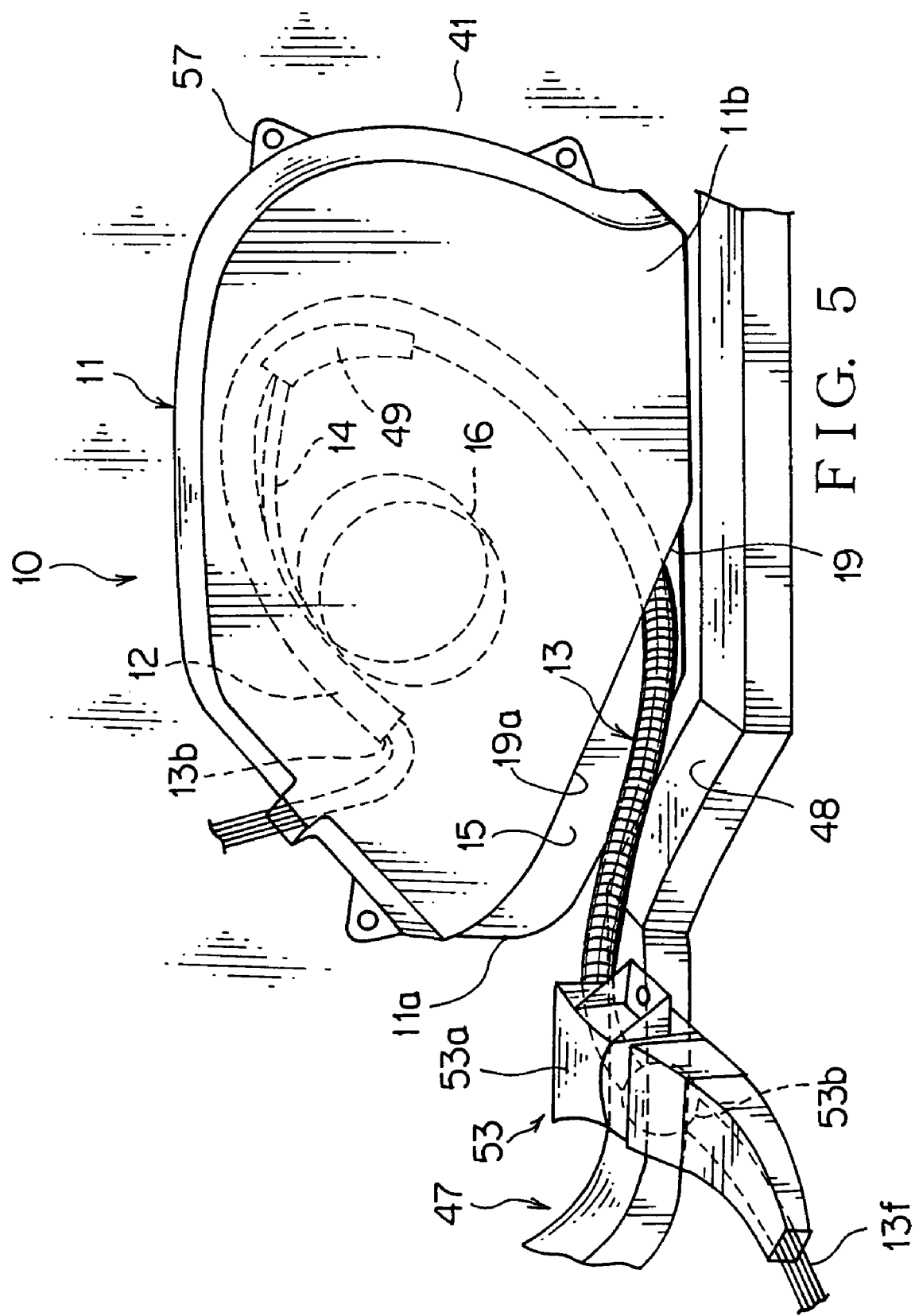

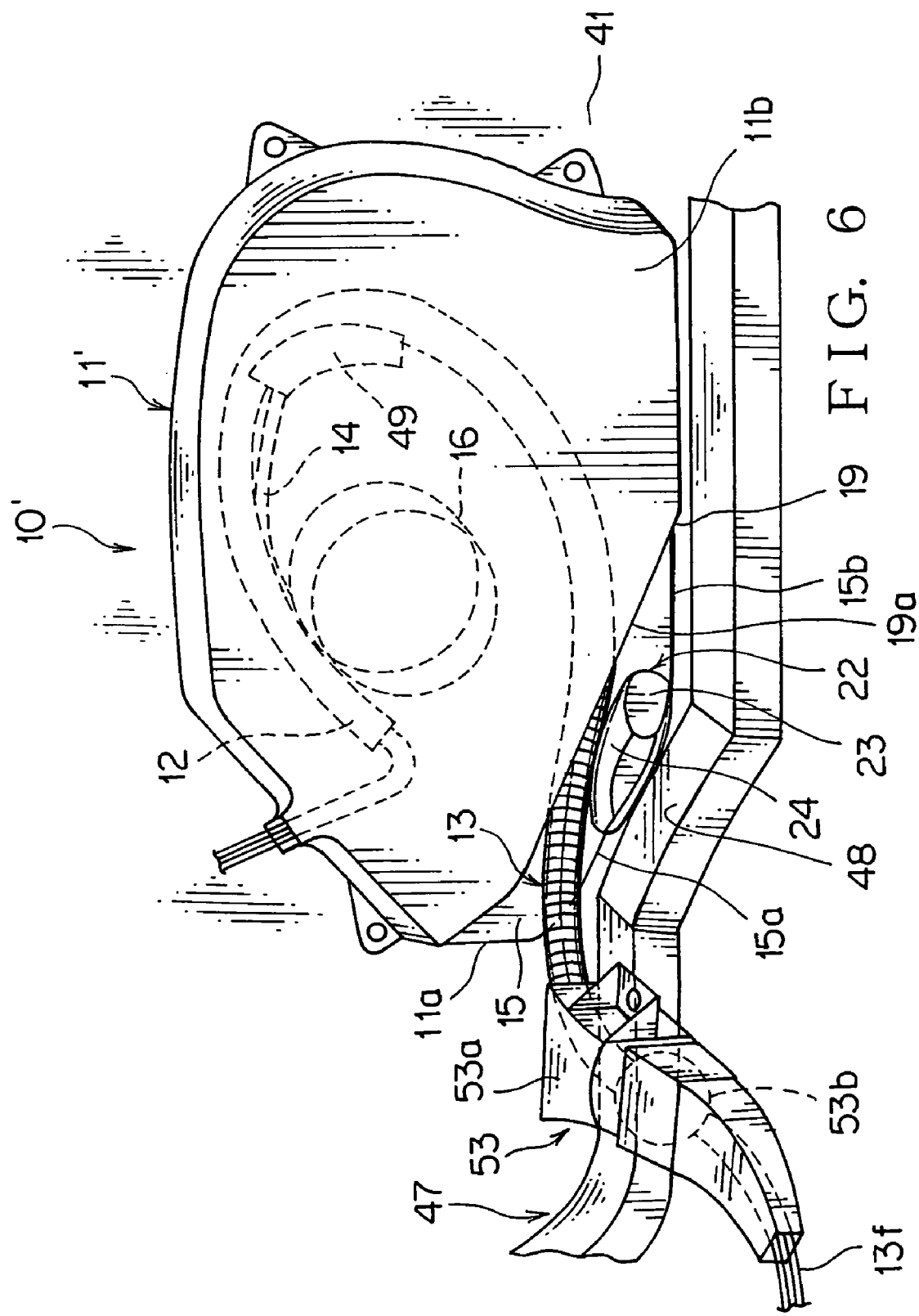

ELECTRIC SUPPLY DEVICE

BACKGROUND OF THE INVENTION (1) Field of the Invention

The present invention relates to an electric supply device which includes a protector mounted on a slide structure such as a slide door of a motor vehicle and receives electric power or electric signals transmitted from a fixed structure such as a vehicle body.

(2) Description of the Related Art

FIGS. 8 and 9 show an example of a conventional electric supply device (for example, see Japanese Patent Application Laid-Open No. 2002-17032; page 4 and FIGS. 4 and 5).

An electric supply device 50 is arranged in a slide door 41 of a motor vehicle and includes a protector 42 made of synthetic resin for flexibly receiving a wiring harness 43 therein and a leaf spring 44 made of metal for biasing the wiring harness 43 upward in the protector 42.

The protector 42 is composed with a protector base (42 for convenience) and a protector cover (not shown in the figure), wherein the protector base 42 and protector cover have perpendicular walls facing with each other and an outer peripheral wall 52, the protector cover is locked to the protector base 42 with a locking means, and the protector base 42 is fixed to a panel of the slide door 41 with a bolt 56 or a locking clip.

A lower end of the leaf spring 44 together with the wiring harness 43 is fixed to a harness fixing part 55 located at a lower front end of the protector 42. An end of the leaf spring 44 slidably supports the wiring harness 43. A cap 49 made of synthetic resin is attached to the end of the leaf spring 44. The wiring harness 43 is stably supported by the cap 49.

A plurality of electric wires 43a are coated with a corrugated tube 43b made of synthetic resin, thereby composing the wiring harness 43, wherein a lower front end of the corrugated tube 43b is fixed to the protector 42 by winding with a tape. The corrugated tube 43b has concave grooves and convex strips alternately, thereby having good flexibility.

The electric wires 43a situated at one portion of the wiring harness 43 are guided out from a front of the protector 42 and connected to an auxiliary situated on the side of the slide door. The corrugated tube 43b situated at an opposite portion of the wiring harness 43 is oscillatorily arranged from a long lower opening 45 of the protector 42 to a harness fixing member (rotation clamp or harness fixing part) 53 situated on the side of a step 48 of a vehicle body 47 through a transfer space 46 (see FIG. 9), wherein the electric wires 43a (not shown in the figure) situated at the opposite portion of the wiring harness 43 are connected to a wiring harness (not shown in the figure) situated on the side of the vehicle body through the harness fixing member 53. The protector 42 is covered with and hidden by a door trim (not shown in the figure) made of synthetic resin, wherein the wiring harness 43 is guided out to the vehicle body side from an opening situated at a lower end of the door trim.

In the transfer space (transfer area) 46, the electric wires 43a in the wiring harness 43 is safely protected from outside interference, water drops or dust by the corrugated tube 43b having relatively high stiffness and high water proofing property. The harness fixing member 53 absorbs torsion of the wiring harness 43 due to oscillation generated when the slide door 41 is opened or closed.

FIG. 8 show a state when the slide door 41 is fully closed, while FIG. 9 show a state when the slide door 41 is almost fully opened. The wiring harness 43 is pulled backward in a state when the slide door 41 is fully closed, while the wiring harness 43 is pulled forward in a state when the slide door 41 is fully opened. Particularly, the wiring harness 43 tends to slacken downward in a state when the slide door 41 is half opened, but such a slack is absorbed because the wiring harness 43 is biased upward by the leaf spring 44, thereby preventing the wiring harness 43 from being caught therein due to a sag thereof.

However, in the conventional electric supply device as described above, as shown in FIGS. 10 (front view), 11 (plan view) and 12 (side view), in which a state of the wiring harness 43 is illustrated when the slide door 41 is fully closed (right side view) and when the slide door 41 is fully opened (left side view), for example, there is a case, in which a horizontal distance L' from the harness fixing member 53 situated on the vehicle body-side to the protector 42 (more correctly, a center position of a ring-shaped wall 16 for restricting a bending angle of the harness of the protector 42) upon fully closing of the slide door 41 must be set short relatively to a stroke for opening and closing of the slide door 41 when a reinforcing member (not shown in the figure) is entered therein in order to improve stiffness of the vehicle body 47, thereby restricting the mounting position of the harness fixing member 53. In such a case, if the length of the wiring harness 43 upon fully closing of the slide door (right side view) is set with reference to the length of the wiring harness 43 upon fully opening of the slide door (left side view), a slack of the wiring harness 43 upon fully closing of the slide door is enlarged, thereby forcing that in order to absorb the slack, the leaf spring 44 must be made long and strong causing a cost-up or, alternatively, the protector 42 (FIG. 8) must be made large in its height direction causing that the size of the protector 42 might exceed a space 20 (FIG. 10) for mounting the protector 42, causing a problem that the protector 42 cannot be mounted on the slide door 41. In FIGS. 10-12, the space 20 that can receive and mount the protector 42 is shown with alternate long and two short dashes lines.

Further, since as shown in the left side view in FIG. 10, the wiring harness 43 is situated winding around the ring-shaped wall 16 of the protector 42 when the slide door 41 is fully opened, the whole length of the wiring harness 43 might tend to enlarge. Further, the wiring harness 43 or the leaf spring 44 might bend with a small radius, causing a problem that the bending durability of the wiring harness 43 or the leaf spring 44 is deteriorated.

Further, in a case that the harness fixing member 53 on the vehicle body-side is arranged in the deep inside of the step (scuff plate) 48 (i.e. in the deep inside of the vehicle body 47) or in a case that the protector 42 upon fully closing of the slide door 41 is arranged low being close to the harness fixing member 53, the wiring harness 43 might interfere with the scuff plate 48 when the slide door 41 is fully closed (i.e. when the vehicle travels), causing noise or wear.

SUMMARY OF THE INVENTION

It is therefore an objective of the present invention to solve the above problems and to provide an electric supply device, by which the increase in the height of the protector can be prevented from occurring even in a case when the horizontal distance from the harness fixing member situated on the vehicle body-side to the protector upon fully closing of the slide door is set short, further, the leaf spring is not necessary to be made long and strong thereby preventing a cost-up from occurring, the bending durability of the wiring harness or the leaf spring upon fully opening of the slide door can be improved, and the wiring harness can be prevented from interfering with the vehicle body-side even if a layout of the harness fixing member or the protector is changed.

In order to attain the above objective, the present invention is to provide an electric supply device including:

a protector arranged in a slide structure; and a wiring harness guided out being bent from a harness fixing part situated in the protector toward a fixed structure, wherein the harness fixing part is situated in an opening direction of the slide structure, wherein the wiring harness is arranged in a closing direction of the slide structure from the harness fixing part, so that the wiring harness is bent nearly in a loop-shape (i.e. not in a completely closed loop-shape but in a shape in which a part of a loop is opened) in the protector when the slide structure is closed.

With the construction described above, when the slide structure is fully closed, the wiring harness is pulled in the opening direction of the slide structure up to the fixed structure while the wiring harness is bent nearly in a loop-shape in the protector. Since the wiring harness is bent nearly in a loop-shape, the wiring harness is received in a small space of the protector, thereby enabling such a space to be compacted when the slide structure is fully closed. Since a loop-shaped part of the wiring harness is extended in its diameter, a slack of the wiring harness is absorbed. Even if a distance of the slide structure from a harness supporting part of the fixed structure to the protector in the opening and closing direction of the slide structure is set short, a slack of the wiring harness is securely absorbed. The slack absorption can be carried out not only by a spring member but also by stiffness (i.e. spring property) of the wiring harness itself. Further, since the wiring harness can be simply arranged in the closing direction of the slide structure while being bent with a radius longer than that in a conventional case without being arranged with a small radius in a folding-back direction within the protector as seen in the conventional case when the slide structure is fully opened, therefore the wiring harness can be prevented from being influenced by an excessive bending stress and can be shortened. The wiring harness smoothly shakes between the protector and the harness fixing part (i.e. harness fixing member) of the fixing structure when the slide structure is opened or closed.

With the construction described above, a size of the protector can be set compact, therefore, the electric supply device can be mounted on a vehicle without a problem of a space for mounting it, thereby improving a value as a commercial product. Further, the bending durability of the wiring harness can be improved and the cost of the wiring harness can be reduced since the length of the wiring harness can be set short.

Preferably, a spring member is formed being extended in a closing direction of the slide structure from the harness fixing part.

With the construction described above, the spring member is arranged along the wiring harness and the loop-shaped part of the wiring harness is biased in a diameter-enlarging direction when the slide structure is fully closed, so that a slack of the wiring harness can be securely absorbed. The spring member biases the wiring harness in the opening direction of the slide structure taking the harness fixing part as a supporting point. Since the wiring harness is bent nearly in a loop-shape with a radius smaller than that in a conventional case when the slide structure is fully closed, the spring member can be shorter than that in a conventional case. When the slide structure is fully opened, the spring member biases the wiring harness with a large bending radius in a diameter-enlarging direction (i.e. in the opening direction of the slide structure) taking the harness fixing part as a supporting point, thereby securely absorbing a slack of the wiring harness. The wiring harness is biased by the spring member and smoothly bent with a large radius so as to be pulled toward the harness supporting part of the fixed structure. Preferably, the spring member may be a leaf spring which comes in contact with an inner side surface of the bent wiring harness or a coil spring which is inserted into the wiring harness from the outside.

With the construction described above, the spring member securely absorbs a slack of the wiring harness from a fully opened state to a fully closed state of the slide structure. Further, since a short spring member can support the wiring member with a margin in its spring force when the slide structure is fully closed, therefore the cost of the spring member can be reduced, the workability of setting of the spring member can be improved, and the bending durability of the spring member can be improved since the spring member can bend with a large radius when the slide structure is fully opened.

Preferably, the protector is therein provided with a ring-shaped wall, which restricts a bending angle of the wiring harness, adjacent to the harness fixing part in a closing direction of the slide structure.

With the construction described above, the wiring harness is situated nearly in a loop-shape along the outside of the ring-shaped wall within the protector when the slide structure is fully closed and comes in contact with the ring-shaped wall at the harness fixing part when the slide structure is fully closed and is guided out from the protector toward the fixed structure-side with leaving from the ring-shaped wall in the diameter-enlarging direction. When the slide structure is rapidly opened or closed, the wiring harness and the spring member come in contact with the ring-shaped wall, thereby preventing the wiring harness and the spring member from further being bent with a small radius. That is, the wiring harness and the spring member are prevented from excessively being bent along the ring-shaped wall of the protector, thereby the bending durability of the wiring harness and the spring member can be improved.

Preferably, a projection for supporting the wiring harness is provided in the proximity of an opening of the protector, from which the wiring harness is guided out toward the fixed structure.

With the construction described above, from a state when the slide structure is almost fully closed to a state when the slide structure is fully closed, the wiring harness, which is guided out from the opening of the protector to the harness fixing part (fixing member) of the fixed structure, is pulled in the closing direction of the slide structure and slides upward along the projection so as to climb over the projection, so that the wiring harness is supported at a higher position. When the slide structure is half opened, the protector faces the harness fixing part, for example, and the wiring harness is situated in the closing direction of the slide structure relatively to the projection. When the slide structure is almost fully closed, the wiring harness slides upward along the projection and climbs over the projection so as to be supported when the slide structure is fully closed. For example, even if the protector on the side of the slide structure and the harness fixing part on the side of the fixed structure are arranged closely to each other in the height direction or even if the harness fixing part is arranged at depths of the fixed structure, interference between the wiring harness and the fixed structure is prevented from occurring by the action described above.

With the construction described above, for example, the noise during travelling of a vehicle or wear of the wiring harness can be prevented from occurring, thereby improving the quality of the vehicle and reliability of the electric supply.

Preferably, the projection includes a first inclined surface for guiding the wiring harness and a second inclined surface for supporting the wiring harness, the second inclined surface being formed in continuation to the first inclined surface.

With the construction described above, when the slide structure is almost fully closed, the wiring harness slides upward along the first inclined surface, then the wiring harness smoothly runs on from the first inclined surface to the second inclined surface so as to be supported there. At that time, since the wiring harness is pulled in a range from the protector to harness fixing part of the fixed structure, therefore the wiring harness never comes off from the projection despite that the second inclined surface is inclined. When the slide structure is opened from its fully closed state, the wiring harness smoothly runs down along the second inclined surface and is situated in the closing direction of the slide structure relatively to the projection. The first and second inclined surfaces may have a tapered shape (plane shape) or a bent shape. Preferably, the first inclined surface may have a tapered shape (plane shape) and the second inclined surface may have a bent shape.

With the construction described above, the wiring harness can be prevented from excessively shaking. A smooth opening operation of the slide structure and the smooth shaking of the wiring harness can be attained.

BRIEF DESCRIPTION OF THE DRAWINGS

FIG. 5 is a perspective view in a closed state of a slide door illustrating an embodiment in which an arrangement of a protector and harness fixing member of an electric supply device according to the present invention is changed;

FIG. 6 is a perspective view in a closed state of a slide door illustrating another embodiment in which an arrangement of a protector and harness fixing member of an electric supply device according to the present invention is changed;

DESCRIPTION OF THE PREFERRED EMBODIMENTS

Figure 1:
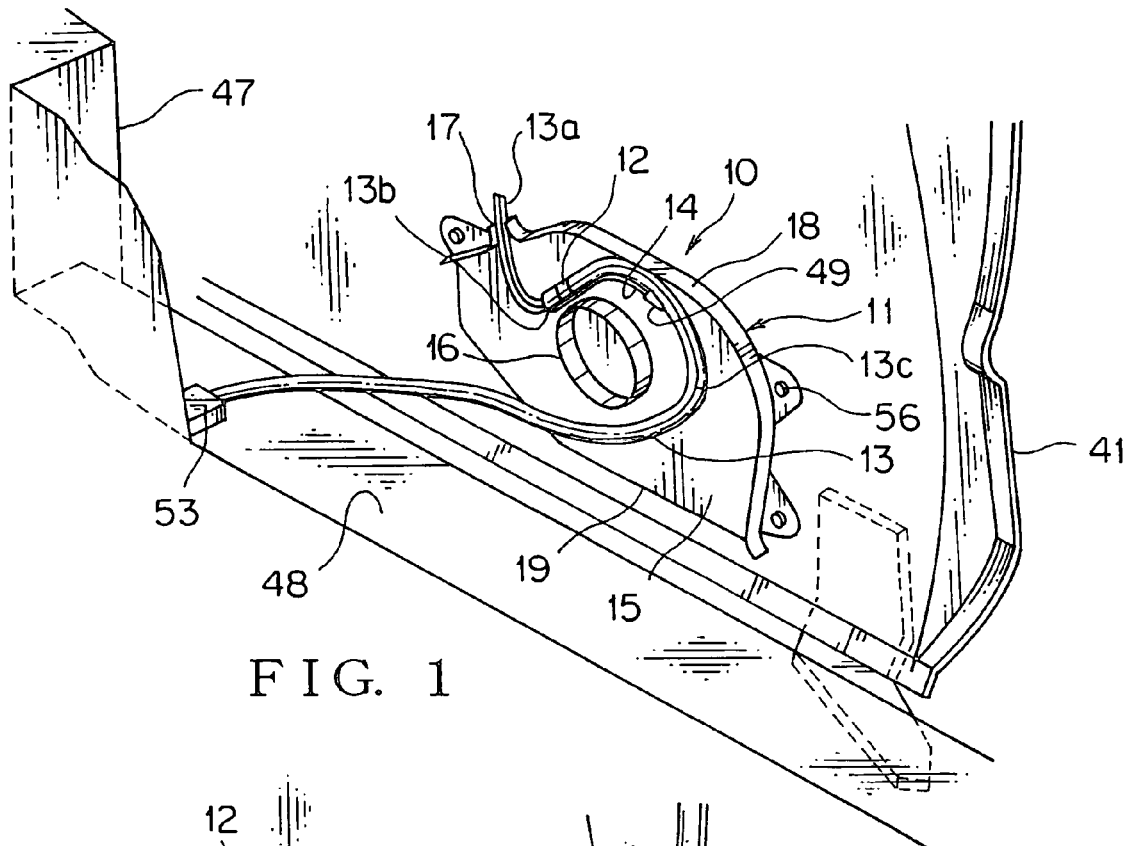
FIG. 1 is a perspective view in a closed state of a slide door illustrating a preferred embodiment of an electric supply device according to the present invention.
Figure 2:
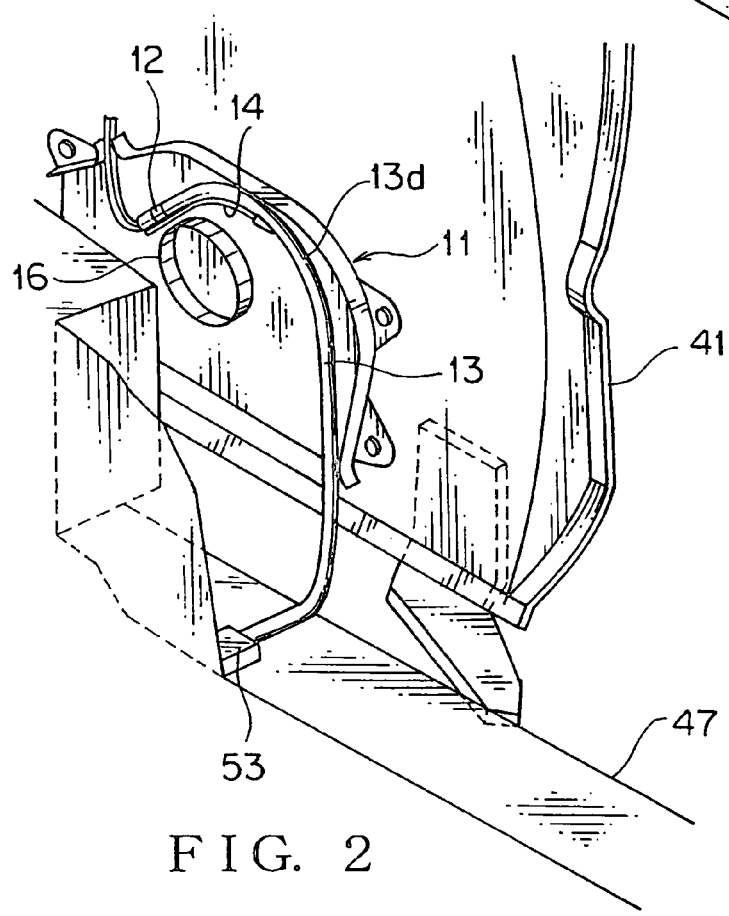
FIG. 2 is a perspective view in an opened state of a slide door illustrating a preferred embodiment of an electric supply device according to the present invention.

Each of FIGS. 1 and 2 shows a preferred embodiment of an electric supply device according to the present invention. FIG. 1 illustrates a state when a slide door is fully closed, while FIG. 2 illustrates a state when a slide door is almost fully opened.

An electric supply device 10 includes: a protector 11 made of synthetic resin for receiving a wiring harness 13 therein; the wiring harness 13 arranged being bent in a range from a harness fixing part 12 situated on a rear half of the protector 11 to a front half of the protector 11; and a leaf spring (spring member) 14 made of metal which extends forward from the harness fixing part 12 and biases the wiring harness 13 upward, wherein the wiring harness 13 is bent downward nearly in a loop-shape (i.e. not in a completely closed loop-shape but in a shape in which a part of a loop is opened) within the protector 11 when a slide door (slide structure) 41 is fully closed as shown in FIG. 1, while the wiring harness 13 is bent nearly in a mountain-shape within the protector 11 when the slide door 41 is fully opened as shown in FIG. 2.

As shown in FIG. 1, the protector 11 is composed of a protector base (11) and a protector cover (not shown in the figure), wherein a ring-shaped wall 16 is formed on a perpendicular base wall 15 at a rear half or near to the center of the protector 11, a base end (root part) of the leaf spring 14 is fixed on a rear end-side of the ring-shaped wall 16 by screwing or press fitting, the leaf spring 14 diagonally extends forward above the ring-shaped wall 16, and a cap 49 made of synthetic resin attached on an end of the leaf spring 14 reaches to a front half of the protector 11. Preferably, a lower opening 19 at a rear half of the protector 11 is notched upward diagonally, so that the wiring harness 13 can be smoothly guided out toward a vehicle body-side when the slide door 41 is fully closed. The leaf spring 14 itself is a little bent downward (but upward more than horizontal) while the leaf spring 14 biases the wiring harness 13 upward. The leaf spring 14 stands up perpendicularly in a free state (i.e. when the load of the wiring harness 13 is released).

Figure 8:
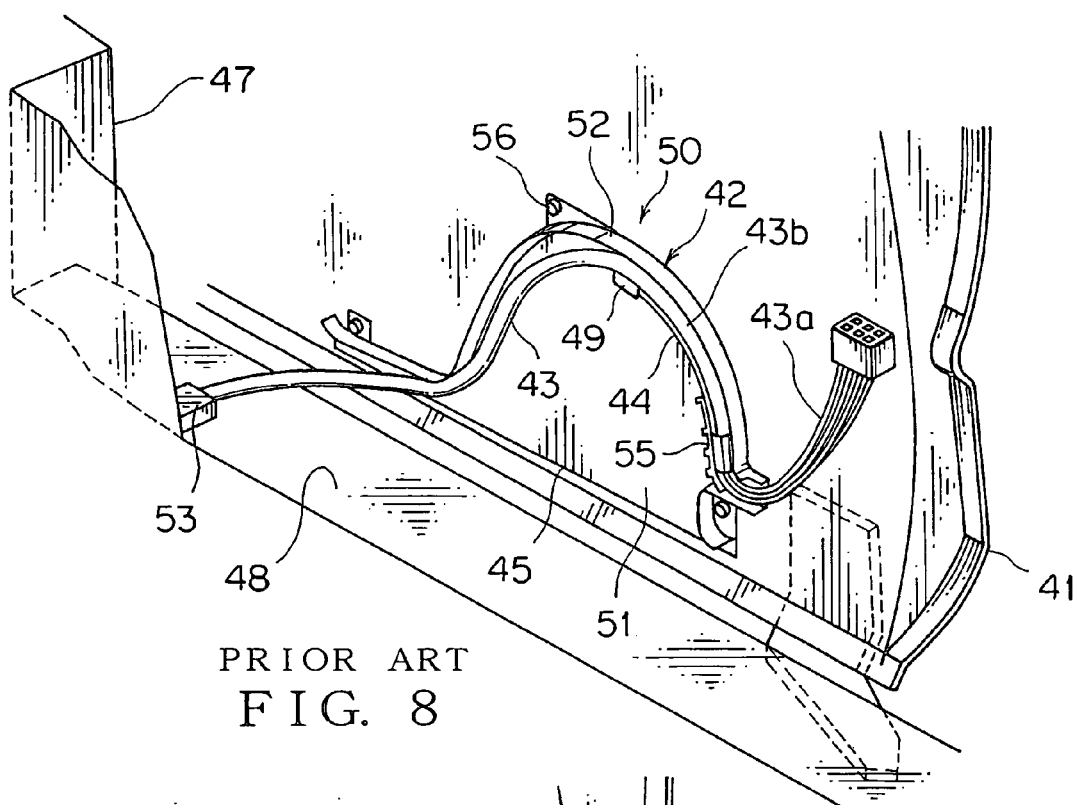
FIG. 8 is a perspective view in a closed state of a slide door illustrating an example of a conventional electric supply device.
Figure 9:
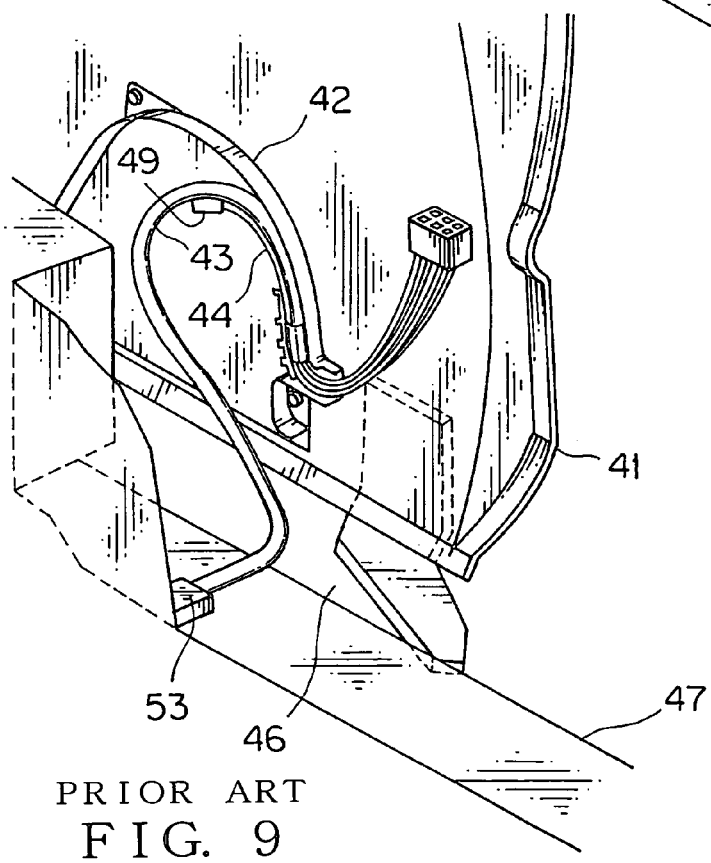
FIG. 9 is a perspective view in a opened state of a slide door illustrating an example of a conventional electric supply device.

The harness fixing part 12 is situated outside the base end of the leaf spring 14. The leaf spring 14 is situated between the wiring harness 13 and the ring-shaped wall 16. The harness fixing part 12 may be a rectangular cylindrical member for holding and fixing a corrugated tube 13b made of synthetic resin situated on an outer periphery of the wiring harness 13. Alternatively, the harness fixing part 12 may fix the wiring harness 13 by winding with a tape around a plate-shaped member (55 in FIG. 8) as mentioned in the conventional example. The harness fixing part 12 may be integrally provided with a spring fixing means.

The "front and rear" in the specification means the front and rear of the slide door 41, that is, the front and rear of a vehicle. The slide door 41 shown in FIG. 1 is a left door of a vehicle, wherein the slide door 41 slidingly closes forward and slidingly opens rearward. Immediately after the slide door 41 starts to open, the slide door 41 parts away from a door opening toward the outside along a guide rail (not shown in the figure) on the side of a vehicle body, so that the slide door 41 is situated in parallel with an outer wall surface of the vehicle body (fixed structure) 47. Such a structure of the slide door 41 is the same as that of a conventional slide door.

In a state when the slide door 41 is fully closed as shown in FIG. 1, the corrugated tube 13b situated on an outer periphery of the wiring harness 13 is fixed to the outside of the ring-shaped wall 16 of the protector 11, the leaf spring 14 is situated inside (i.e. in front of) the wiring harness 13, and the ring-shaped wall 16 is situated inside (i.e. in front of) the leaf spring 14. A portion of electric wires 13a of the wiring harness 13 is guided out from a narrow opening 17 situated at a rear end of the protector 11 toward the outside and connected to an auxiliary and so on situated within the slide door.

The opening 17 for guiding the electric wires out may be formed penetrating through the base wall 15 of the protector 11 instead of forming it on the rear end-side of the protector 11 as described above. Alternatively, the portion of the electric wires 13a may be folded along the corrugated tube 13b so as to be guided out from an opening (not shown in the figure) of an upper peripheral wall 18. The wiring harness 13 is composed of the corrugated tube 13b and a plurality of the electric wires 13a.

The wiring harness 13 is downward bent at the front half of the protector 11 being supported by the leaf spring 14 and guided out from a long opening 19 situated at a lower end of the protector 11 and reaches to a harness fixing member (rotation clamp or harness fixing part) 53 situated on the side of a step 48 of the vehicle body 47 being extended with being pulled rearward through a lower opening of a door trim (not shown in the figure) made of synthetic resin. The harness fixing member 53 is not necessarily arranged on a step 48. The harness fixing member 53 is made of synthetic resin and rotatably supports an inner member (not shown in the figure) inside an outer member (53), wherein the corrugated tube 13b of the wiring harness 13 is fixed to the inner member.

In a state when the slide door 41 is fully closed as shown in FIG. 1, since the wiring harness 13 is bent nearly in a loop-shape (i.e. not in a completely closed loop-shape) within the protector 11, the wiring harness 13 can be received within the protector 11 even if the wiring harness 13 is long and a space in the protector 11 for receiving the wiring harness 13 is small. Further, the wiring harness 13 is securely biased upward by the leaf spring 14, which is shorter than a conventional one, so as to absorb a slack of the wiring harness 13. A portion having a loop-shape of the wiring harness 13 is denoted by a reference numeral 13c in FIG. 1.

Figure 3:
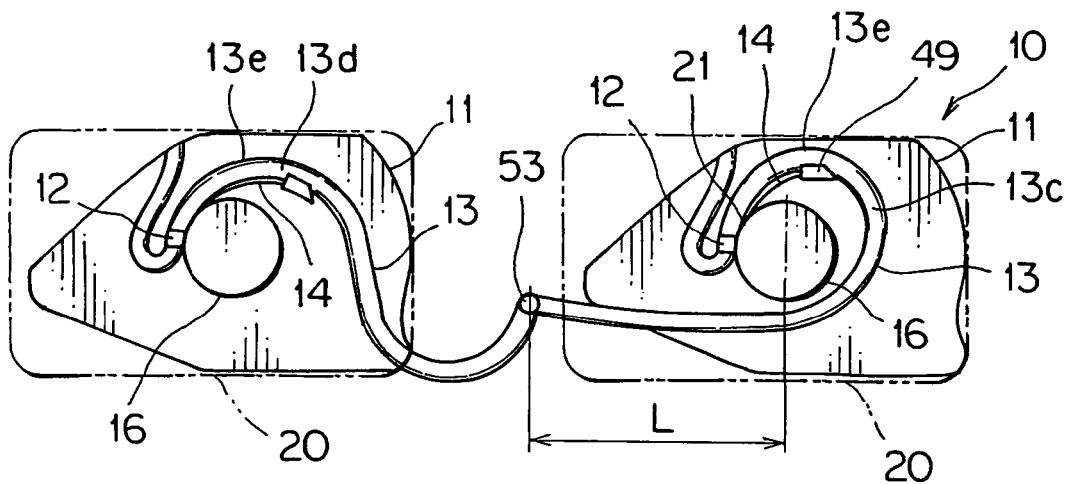
FIG. 3 is a front view illustrating an action of an electric supply device according to the present invention.
Figure 4:
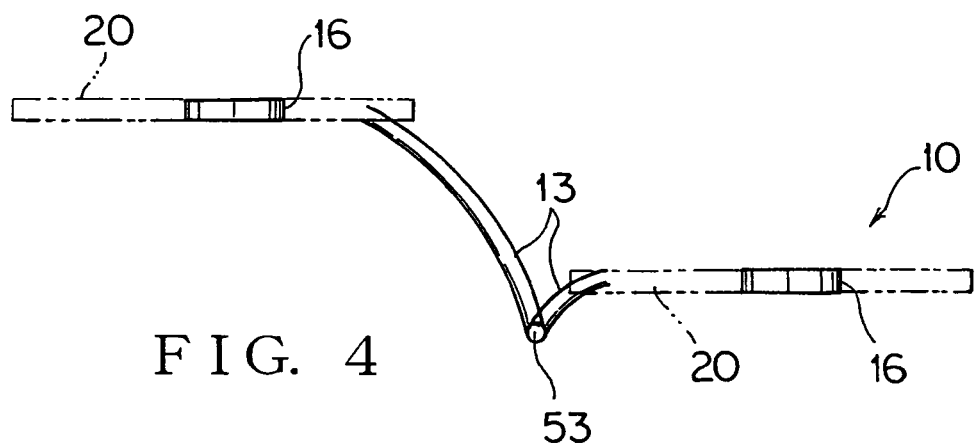
FIG. 4 is a plan view illustrating an action of an electric supply device according to the present invention.
Figure 12:
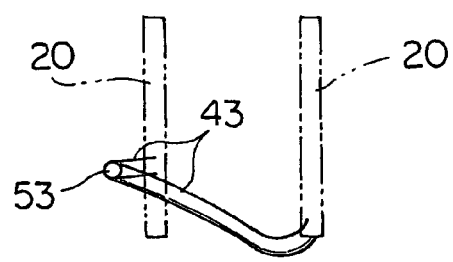
FIG. 12 is a side view illustrating an action of a conventional electric supply device.

FIG. 3 is a front view illustrating how the wiring harness 13 is arranged when the slide door 41 is fully closed (right side view) and when the slide door is fully opened (left side view). FIG. 4 is a plan view illustrating how the wiring harness 13 is arranged when the slide door 41 is fully closed (right side view) and when the slide door is fully opened (left side view). Here, a side view thereof is omitted since such a side view is the same as the side view shown in FIG. 12. A horizontal distance L (see FIG. 3) from the harness fixing member 53 on the vehicle body-side to the center of the protector 11 when the slide door 41 is fully closed is set shorter than a conventional distance L' (see FIG. 10). In such a state, as shown in the right side of FIG. 3, the loop-shaped portion 13c of the wiring harness 13 is received within a space 20 for receiving the protector 11 with having some room when the slide door 41 is fully closed, wherein the space 20 has the same shape as that of the space 20 shown in FIG. 10 (i.e. conventional example).

Figure 10:
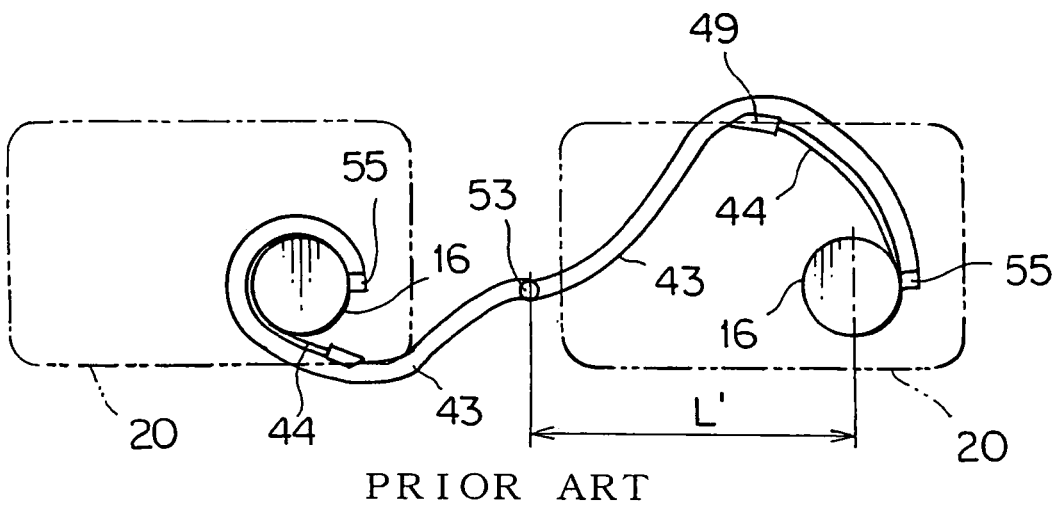
FIG. 10 is a front view illustrating an action of a conventional electric supply device.

In comparison with the conventional example shown in FIG. 10, in the present invention, as shown in the right side of FIG. 3, when the slide door 41 is fully closed, since the wiring harness 13 passes through the lower side of the ring-shaped wall 16 and is guided out toward the vehicle body-side, therefore the space 20 for mounting the protector 11 can be reduced not only for the upper portion thereof but also for the upper rear portion thereof, that is, the size of the protector 11 can be reduced. For an example, the horizontal distance L from the harness fixing member 53 to the center of the ring-shaped wall 16 in FIG. 3 is about 80% of the conventional horizontal distance L' shown in FIG. 10.

When the slide door 41 is slid rearward to be opened starting from its fully closed state shown in FIG. 1, as shown in FIG. 2 and FIG. 3 (left view), while the wiring harness 13 is biased upward by the leaf spring 14 within the protector 11, the wiring harness 13 is changed in its shape from nearly in a loop-shape shown in FIG. 1 to nearly in a mountain-shape and the wiring harness 13 is shaken rearward having the harness fixing member 53 on the vehicle body-side as a fixed point and pulled forward. In FIGS. 2 and 3, a portion having the mountain-shape of the wiring harness 13 is indicated by a reference numeral 13d.

As shown in FIG. 3 (left view), a position of a top 13e of the wiring harness 13 when the slide door 41 is fully opened is a little lower than that when the slide door 41 is fully closed (see right view of FIG. 3), while the leaf spring 14 when the slide door 41 is fully opened is bent downward a little bigger than that when the slide door 41 is fully closed. A position of the top 13e when the slide door 41 is half opened (not shown) is about the same as that when the slide door 41 is fully closed (right view of FIG. 3). At time points when the slide door 41 is fully closed and fully opened, the top 13e of the wiring harness 13 may abut against an inner surface of the outer peripheral wall 18 (see FIG. 1) of the protector 11.

In a state when the slide door 41 is fully opened as shown in FIG. 3 (left view), the wiring harness 13 is guided out to the outside of the protector 11 being bent upward and forward with a large radius from the rear end-side of the ring-shaped wall 16. Therefore, the wiring harness 13 is not bent with a small radius being wound around the ring-shaped wall 16 as in the conventional case (see left view of FIG. 10), the bending stress of the wiring harness 13 and the leaf spring 14 can be small, so that the bending durability of the wiring harness 13 and the leaf spring 14 can be improved, and permanent set in fatigue of the leaf spring 14 can be prevented from occurring. Further, since the wiring harness 13 is not bent with a small radius being wound around the ring-shaped wall 16, that is, the whole length of the wiring harness 13 can be set short, therefore the cost of the wiring harness 13 can be reduced.

As shown in FIG. 3, when the slide door 41 is fully opened and when the slide door 41 is fully closed, the amount of displacement of the leaf spring 14 is smaller than that of the leaf spring 44 in the conventional case (FIG. 10). Therefore, a setting of a set load of the leaf spring 14 is easy compared to the conventional case, that is, a set load of the leaf spring 14 at time points when the slide door 41 is half opened, when the slide door 41 is fully opened and when the slide door 41 is fully closed can be set to be any value, therefore the cost of the leaf spring 14 can be reduced, the reliability of slack absorption of the wiring harness can be improved, and a setting work of the set load of the leaf spring 14 can be simplified.

In the preferred embodiment described above, the leaf spring 14 is used to bias the wiring harness 13. However, a coil-shaped spring (not shown in the figure) may be mounted around the outer periphery of the wiring harness 13 instead of the leaf spring 14. In such a case, another protection tube such as a urethane tube or vinyl tube may be used instead of the corrugated tube 13b or, alternatively, a plurality of electric wires may be bundled together by winding with a tape without using a protection tube. Further, alternatively, without using any spring member, the diameter of the wiring harness 13 may be increased so that the wiring harness 13 is nearly in a loop-shape or nearly in a mountain-shape so as to absorb a slack thereof upward by itself by using restoring property due to stiffness of a protection tube such as the corrugated tube 13b.

Further, in the preferred embodiment described above, the electric supply device 10 is disposed in the slide door 41 situated at the left side of the vehicle. However, instead, a electric supply device 10 having a reverse symmetry (in left and right) may be disposed in a slide door situated at the right side of the vehicle. Further, in the preferred embodiment described above, the slide door 41 is slid forward to close a door while the slide door 41 is slid rearward to open the door. However, in a case that the slide door 41 is slid rearward to close a door while the slide door 41 is slid forward to open the door, the electric supply device 10 shown in FIGS. 1 and 2 is mounted in a slide door reversely in front and behind, thereby attaining the same action and effect as described above.

In FIG. 3, the wiring harness 13 is fixed to an end in the opening direction of the slide door 41 of the ring-shaped wall 16 within the protector 11 (that is, the harness fixing part 12 is situated in the opening direction of the slide door 41), the wiring harness 13 is arranged from the harness fixing part 12 facing the closing direction of the slide door 41, the leaf spring 14 is arranged facing the closing direction of the slide door 41 within the protector 11, and the wiring harness 13 is biased upward by the leaf spring 14.

The leaf spring 14 is fixed to an end in the opening direction of the slide door 41 of the ring-shaped wall 16 (a spring fixing part 21 being situated in the opening direction of the slide door 41). However, for example, the leaf spring 14 may be arranged downward from the spring fixing part 21 and extended up to a position of a harness supporting cap 49 shown in FIG. 3 along the ring-shaped wall 16. But in this case, since the leaf spring becomes long, the construction of the leaf spring 14 shown in FIG. 3 is better.

The harness supporting cap 49 is to support the wiring harness 13 stably. However, if an end of the leaf spring 14 is machined into a cap-shape so as to make the sliding with respect to the wiring harness 13 smooth, the cap 49 becomes unnecessary. The ring-shaped wall 16 of the protector 11 restricts the maximum bending diameter of the leaf spring 14 and the wiring harness 13 when the slide door 41 is rapidly closed. However, in normal use, the ring-shaped wall 16 may not be indispensable.

The electric supply device 10 can be applicable not only to a slide door 41 in a vehicle but also to various slides structures such as a slide door in a machine tool. The vehicle body 47 or a machine tool body, on the side of which the slide structure is slidably arranged, can be called the fixed structure. The electric supply device 10 can be arranged in the slide structure not only longitudinally but also laterally (horizontally).

Further, the electric supply device 10 may be mounted laterally (horizontally) on the fixed structure such as the vehicle body 47 instead of the slide structure. In such a case, the portion 13a of the wiring harness 13 guided out from the opening 17 situated at the harness fixing part 12-side of the protector 11 is connected to a wiring harness (not shown in the figure) situated on the side of the vehicle body 47 and a portion of the wiring harness 13 guided out from the long opening 19 of the protector 11 is arranged up to the slide door 41-side through a transfer part and connected to a door harness or an auxiliary.

Further, instead of using the protector 11 made of synthetic resin, for example, a door panel of the slide door 41 may be provided with a concave part (not shown), in which the wiring harness 13 is received, and a leaf spring is provided there, so that the concave part may be covered and sealed with an inner wall surface of a door trim or, alternatively, a door trim may be provided with a concave part (not shown), so that the concave part may be sealed with a surface of the door panel. In such cases, the concave part of the door panel and the inner wall surface of the door trim compose a protector (not shown) or, alternatively, the surface of the door panel and the concave portion of the door trim compose a protector (not shown). In such cases, differently from a unit structure using the protector 11, mounting of the wiring harness 13 and the leaf spring 14 to the slide door 41 requires many man-hour. Each embodiment described above is effective not only as an electric supply device but also as an arrangement structure of a wiring harness.

FIG. 5 shows a state, in which the electric supply device 10 according to the above preferred embodiment is arranged in the slide door 41, the harness fixing member 53 situated at the vehicle body 47-side is arranged in the depths of a scuff plate 48 that is a step, and the slide door 41 is fully closed. The state illustrated in FIG. 5 is similar to a state, in which the protector 11 and the harness fixing member 53 are arranged close to each other in the height direction. (The protector 11 is preferably arranged at a little higher position than that shown in FIG. 5.) In FIG. 5, the right side corresponds to the forward side of the vehicle and the left side corresponds to the rear side of the vehicle. The slide door 41 is closed in the forward direction of the vehicle.

At a rear half 19a of the lower opening 19 a protector cover 11b of the protector 11 is formed smaller than a protector base 11a and a part of a perpendicular base wall 15 is exposed between a door inner panel and a door trim (not shown in the figure). The rear half 19a of the lower opening 19 and the exposed portion of the base wall 15 are inclined upward diagonally. A bracket 57 situated at the protector base 11a is fixed to the door inner panel.

The wiring harness 13 is bent nearly in a loop-shaped within the protector 11. One portion of the wiring harness 13 is fixed by the harness fixing part 12 situated at a rear end-side of the ring-shaped wall 16 while the wiring harness 13 is guided into the slide door 41 from an upper part of the protector 11. An opposite portion of the wiring harness 13 is arranged to the harness fixing member 53 situated in the depths of the scuff plate 48 through a rear half of the lower opening 19.

The harness fixing part 12 of the protector 11 is composed of, for example, a plurality of ribs for engaging concave grooves situated in a peripheral direction of the corrugated tube 13b therewith. The lower opening 19 continues long from a front end to a rear end of the protector 11. In FIG. 5, the reference numeral 14 denotes the leaf spring and 49 denotes the supporting cap. The electric supply device 10 according to the preferred embodiment includes the protector 11, leaf spring 14 and harness fixing member 53.

The harness fixing member 53 according to the preferred embodiment is composed of a dividable outer clamp (outer member) 53a made of synthetic resin and a dividable inner clamp (inner member) 53b having an approximately sphere-shape, which is rotatably held within the outer clamp 53a, wherein the inner clamp 53b has ribs for engaging with the concave grooves situated in a peripheral direction of the corrugated tube 13b. The wiring harness 13 is guided out to the vehicle body-side from the inner clamp 53b as a plurality of electric wires 13f. Preferably, the outer clamp 53a is supported by the vehicle body-side shakably having a perpendicular pin as a fixed point.

As shown in FIG. 5, if the harness fixing member 53 situated at the vehicle body-side is arranged in the depths of the scuff plate 48 or if the protector 11 and the harness fixing member 53 are arranged close to each other in the height direction, since the wiring harness 13 is arranged being bent downward from the forward to the rearward of the protector 11, the scuff plate 48 and the wiring harness 13 might tend to interfere with each other. If the two interfere with each other, noise during traveling of a vehicle or wear due to vibration of the vehicle might occur.

Therefore, in an electric supply device 10' according to a modified preferred embodiment shown in FIG. 6, the device 10' is provided with a projection 22 for supporting the wiring harness 13 on a base wall 15 of a protector base 11a in the proximity of the height direction of the lower opening 19 at a rear half 19a of the lower opening 19 of the protector 11', so that the wiring harness 13 is lifted up by the projection 22 when the slide door 41 is fully closed. The projection 22 is arranged approximately in parallel along an inclined side 15a from a lower end (crossing point between the inclined side 15a and a horizontal side 15b) of the upward inclined side 15a in an exposed portion of the base wall 15. The projection 22 is integrally formed with the protector base 11a. When the slide door 41 is fully closed, the harness fixing member 53 is situated within the vehicle body 47 in a little rear of the projection 22.

Figure 7C:
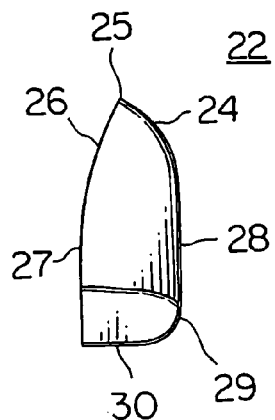
FIG. 7C is a side view illustrating a projection for supporting a wiring harness in a preferred embodiment of the present invention.
Figure 7A:
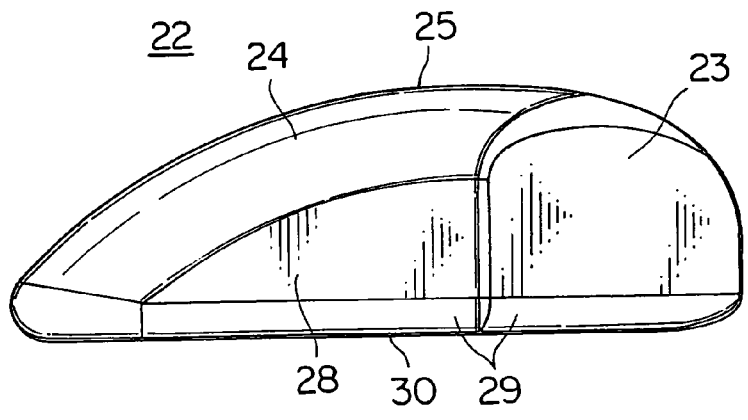
FIG. 7A is a front view illustrating a projection for supporting a wiring harness in a preferred embodiment of the present invention.
Figure 7B:
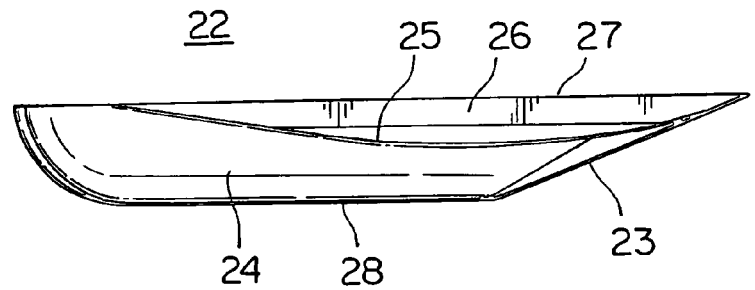
FIG. 7B is a plan view illustrating a projection for supporting a wiring harness in a preferred embodiment of the present invention.
Figure 11:
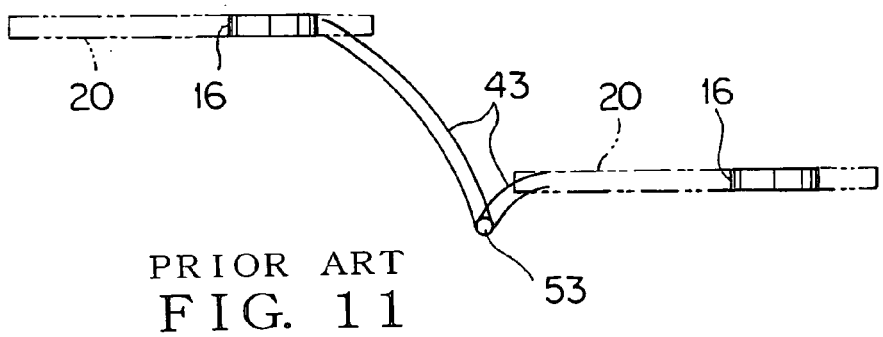
FIG. 11 is a plan view illustrating an action of a conventional electric supply device.

As shown in FIGS. 7A-7C, the projection 22 includes an inclined surface 23 (first inclined surface) situated in front and an inclined surface 24 (second inclined surface) situated at the upper side which is formed in continuation to the inclined surface 23 situated in front. The inclined surface 23 is nearly a perpendicular surface, standing rearward and upward diagonally in a tapered shape from an inner surface of the base wall 15 of the protector base 11a and continuing to the inclined surface 24 situated at the upper side crossing with the inclined surface 24. FIG. 7A is a front view, FIG. 7B is a plan view, and FIG. 7C is a left side view.

The inclined surface 24 situated at the upper side is formed in a bent shape (arc-shape) in section and continues in a bent shape starting from approximately a center position in the height direction of the projection 22 up to a top 25 of the projection 22. As shown in FIG. 7C, the top 25 is situated approximately at a center in the width direction of the projection 22. The surface of the projection 22 continues from the top 25 to an inner surface of the base wall 15 (see FIG. 6) through an inclined surface 26 and perpendicular surface 27 at the back. As shown in FIG. 7B, the top 25 having a ridge-shape continues in the longitudinal direction of the projection 22. The inclined surface 24 situated at the upper side continues to a perpendicular surface 28 at the lower side thereof. A bent surface 29 having a small radius and arc-shape in section is formed for the whole length of the projection 22 (including for the inclined surface 23 at the front side) at a lower end part of the projection 22. The bent surface 29 continues to the inclined surface 23 at the front side, the perpendicular surface 28 situated in the middle, and a flat bottom surface 30.

When the slide door 41 is fully closed (i.e. while the slide door 41 is moved to the right side in FIG. 6 starting from an almost closed state to a fully closed state) as shown in FIG. 6, the wiring harness 13 is guided upward along the inclined surface 23 situated at the front side of the projection 22 and supported by the inclined surface 24 situated at the upper side of the projection 22 at a position higher than a position in a case that the projection 22 does not exist. Thereby, an interference between the wiring harness 13 and the scuff plate 48 is prevented from occurring, further, the wiring harness 13 is prevented from being caught between the scuff plate 48 and the slide door 41 when the slide door 41 is closed.

In the following, a sliding action between the wiring harness 13 and the projection 22 is explained with reference to FIG. 7. First, an upper side surface of the wiring harness 13 slides coming in contact with the bent surface 29 of the projection 22 while one side surface of the wiring harness 13 slides coming in contact with the inclined surface 23, then a lower side surface of the wiring harness 13 is supported by the inclined surface 24 coming in contact therewith. The lower side surface of the wiring harness 13 mounts to the inclined surface 24 below the top 25 of the projection 22. The bent surface 29 smoothly guides the wiring harness 13 to the inclined surface 23 and the inclined surface 23 smoothly guides the wiring harness 13 to the inclined surface 24.

When the slide door 41 is to be opened being slid toward the left side (i.e. the rearward direction of the vehicle) in FIG. 6 starting from a fully closed state thereof, the wiring harness 13 shakes forward. At that time, the wiring harness 13 smoothly comes down along the inclined surface 24 of the projection 22 so as to climb over the projection 22.

When the slide door 41 is being closed as shown in FIG. 6 starting from an opened state thereof as shown in FIG. 2, the wiring harness 13 smoothly rises along the inclined surface 23 from a lower end side of the projection 22 and is supported by the inclined surface 24. Since the inclined surface 24 is bent not in a tapered shape like the inclined surface 23 but in a bent shape, the inclined surface 24 stably supports the wiring harness 13 by preventing the wiring harness 13 from sliding down.

The inclined surface 24 for supporting the wiring harness 13 of the projection 22 may be formed in a tapered shape (i.e. plane shape) instead of in a bent shape. The inclined surface 23 for guiding the wiring harness 13 of the projection 22 may be formed in a bent shape instead of in a tapered shape (i.e. plane shape). With such constructions, an effect of lifting up of the wiring harness 13 can also be attained to some extent.

Further, the shape of the projection 22 can be modified according to a need. For example, the projection 22 may have the inclined surface 23 situated at the front side and a flat surface (harness supporting surface) instead of the bent surface 24 situated at the upper side. Alternatively, the projection 22 may have an inclined surface (harness guiding surface formed by enlarging the bent surface 29 situated at the lower end side) situated at the lower half side and the bent surface 24 or a flat surface situated at the upper side as a harness supporting surface.

In the preferred embodiment described above, the protector base 11a of the protector 11' is provided with the projection 22. However, instead of the protector base 11a, a perpendicular inner side surface of the protector cover 11b of the protector 11' may be provided with the projection 22. In such a case, a lower part of the rear half of the protector cover 11b is preferably formed being extended as much as a lower part of the rear half of the protector base 11a.

Further, the wiring harness 13, which is lifted up and supported by the projection 22, may be provided with a protection tube such as a net-shaped tube or vinyl tube instead of the corrugated tube 13b. Alternatively, the wiring harness 13 may be a plurality of electric wires 13f bundled up with a tape without using a protection tube.

Further, a form or arrangement of the spring member such as the leaf spring 14 can be modified according to a need. The ring-shaped wall 16 for restricting the bending may be unnecessary. A shape of the protector 11' can be modified according to a need. The harness fixing member 53 is not limited to one for supporting the wiring harness 13 rotatably in the peripheral direction. Instead, the harness fixing member 53 may be one for supporting the wiring harness 13 shakably in the front-and-rear direction. Alternatively, the harness fixing member 53 may be one for fixing the wiring harness 13 to prevent the wiring harness 13 from rotating or shaking. In a case when a corrugated tube having an elliptic shape or flat shape in section is used, the wiring harness 13 can be supported by an inner clamp 53b. In a case when a corrugated tube having a circle shape in section is used, the wiring harness 13 can be supported only by an outer clamp 53a without an inner clamp 53b.

Further, the slide door 41, in which the protector 11' is arranged, may be closed not in the forward direction of the vehicle but in the rearward direction of the vehicle, that is, the slide door 41 may be opened in the forward direction of the vehicle. In such a case, the arrangement of the protector 11', wiring harness 13 and harness fixing member 53 has a form which is symmetrical in the front-and-rear direction to that of the arrangement shown in FIG. 6.

What is claimed is:

1. An electric supply device comprising:
   a protector arranged in a slide structure; and
   a wiring harness guided out being bent from a harness fixing part situated in the protector toward a fixed structure, the harness fixing part, comprising a cylindrical member or tape wound about a plate-shaped member, fixing the wiring harness to the protector when the slide structure is in both an opening and closing direction,
   wherein the harness fixing part is situated in an opening direction of the slide structure, and
   wherein the wiring harness is arranged in a closing direction of the slide structure from the harness fixing part, so that the wiring harness is bent nearly in a loop-shape in the protector when the slide structure is closed.

2. The electric supply device according to claim 1, wherein a spring member is formed being extended in a closing direction of the slide structure from the harness fixing part.

3. The electric supply device according to claim 1, wherein the protector is therein provided with a ring-shaped wall, which restricts a bending angle of the wiring harness, adjacent to the harness fixing part in a closing direction of the slide structure.

4. The electric supply device according to claim 1, wherein a projection for supporting the wiring harness is provided in the proximity of an opening of the protector, from which the wiring harness is guided out toward the fixed structure.

5. An electric supply device comprising:
   a protector arranged in a slide structure; and
   a wiring harness guided out being bent from a harness fixing part situated in the protector toward a fixed structure,
   wherein the harness fixing part is situated in an opening direction of the slide structure,
   wherein the wiring harness is arranged in a closing direction of the slide structure from the harness fixing part, so that the wiring harness is bent nearly in a loop-shape in the protector when the slide structure is closed,
   wherein a projection for supporting the wiring harness is provided in the proximity of an opening of the protector, from which the wiring harness is guided out toward the fixed structure, and
   wherein the projection includes a first inclined surface for guiding the wiring harness and a second inclined surface for supporting the wiring harness, the second inclined surface being formed in continuation to the first inclined surface.

* * * * *